United States Patent
Na et al.

(10) Patent No.: US 11,436,081 B2
(45) Date of Patent: Sep. 6, 2022

(54) STORAGE CONTROLLER, STORAGE SYSTEM AND METHOD OF OPERATING THE SAME

(71) Applicant: SAMSUNG ELECTRONICS CO., LTD., Suwon-si (KR)

(72) Inventors: Hanbyeul Na, Yongin-si (KR); Jaehun Jang, Hwaseong-si (KR); Hongrak Son, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 71 days.

(21) Appl. No.: 17/018,763

(22) Filed: Sep. 11, 2020

(65) Prior Publication Data

US 2021/0224152 A1 Jul. 22, 2021

(30) Foreign Application Priority Data

Jan. 17, 2020 (KR) .......................... 10-2020-0006573

(51) Int. Cl.
*G06F 11/10* (2006.01)
*G06F 11/07* (2006.01)

(52) U.S. Cl.
CPC ........ *G06F 11/1068* (2013.01); *G06F 11/076* (2013.01); *G06F 11/0772* (2013.01); *G06F 11/1044* (2013.01)

(58) Field of Classification Search
CPC ............. G06F 11/1024; G06F 11/1048; G06F 11/1068; G06F 13/1668; G06F 11/076; G06F 11/0772; G06F 11/104; G06F 11/1044; G06F 11/183; G06F 3/0611; G06F 3/0614; G06F 3/0658
See application file for complete search history.

(56) References Cited

U.S. PATENT DOCUMENTS

| | | | |
|---|---|---|---|
| 5,907,671 A | 5/1999 | Chen et al. | |
| 6,910,173 B2 | 6/2005 | Mitra et al. | |
| 6,963,217 B2 | 11/2005 | Samudrala et al. | |
| 7,092,464 B2 | 8/2006 | Mills | |
| 7,716,561 B2 | 5/2010 | Belogolovyi et al. | |
| 7,900,125 B1 * | 3/2011 | Liu ........................ | H03M 13/45 714/799 |
| 8,122,323 B2 | 2/2012 | Leung et al. | |
| 9,407,294 B2 | 8/2016 | Hanham et al. | |

(Continued)

OTHER PUBLICATIONS

Extended European Search Report dated May 26, 2021 from the European Patent Office in corresponding European Patent Application No. 21151911.1.

*Primary Examiner* — Guy J Lamarre

(74) *Attorney, Agent, or Firm* — F. Chau & Associates, LLC

(57) ABSTRACT

A storage controller includes parallel input channels configured for simultaneously receiving data from substantially redundant memories, an error estimation unit, a decision unit, an error correction unit and a selection unit. The error estimation unit generates error information by estimating an error level of the plurality of data. The decision unit performs a logical operation on the plurality of data to generate operation data. The error correction unit generates error correction data by correcting an error of the operation data. The selection unit selects one of the operation data or the error correction data based on the error information.

20 Claims, 17 Drawing Sheets

(56) References Cited

U.S. PATENT DOCUMENTS

| | | | |
|---|---|---|---|
| 9,577,960 B2 | 2/2017 | Tang et al. | |
| 9,582,374 B2 | 2/2017 | Xu | |
| 10,078,565 B1 | 9/2018 | Petersson | |
| 10,158,380 B2 | 12/2018 | Sharon et al. | |
| 2001/0026486 A1* | 10/2001 | Ogawa | H01L 22/22 365/201 |
| 2006/0156189 A1* | 7/2006 | Tomlin | G06F 12/0246 714/763 |
| 2006/0184856 A1* | 8/2006 | Suzuki | G11C 7/24 714/758 |
| 2008/0091979 A1* | 4/2008 | Okuda | G11C 29/42 714/42 |
| 2011/0138230 A1* | 6/2011 | Nakatani | G06F 11/1645 714/E11.029 |
| 2011/0231738 A1* | 9/2011 | Horisaki | G06F 11/1072 714/780 |
| 2012/0166911 A1* | 6/2012 | Takahashi | G06F 11/1048 714/758 |
| 2014/0047301 A1* | 2/2014 | Kurata | G06F 1/3275 714/773 |
| 2018/0205396 A1* | 7/2018 | Ikegawa | G06F 11/1068 |
| 2019/0164595 A1* | 5/2019 | Kim | G11C 29/023 |

* cited by examiner

STORAGE CONTROLLER, STORAGE SYSTEM AND METHOD OF OPERATING THE SAME

CROSS-REFERENCE TO RELATED APPLICATION

This U.S. non-provisional application claims priority under 35 USC § 119 to Korean Patent Application No. 10-2020-0006573, filed on Jan. 17, 2020, in the Korean Intellectual Property Office (KIPO), the disclosure of which is incorporated by reference herein in its entirety.

TECHNICAL FIELD

The present disclosure relates generally to semiconductor integrated circuits, and more particularly to a storage controller, a storage system and a method of operating the same.

DISCUSSION OF RELATED ART

Artificial intelligence (AI) technology refers to a technology that emulates human abilities, such as perception, learning, reasoning, and/or natural language processing, using computer systems. AI technology is widely applied in various fields of industry. AI applications in fields such as safety, transportation, defense, health care, and the like, in which the data covered may be particularly time-sensitive, may benefit from high speed and/or reliability.

SUMMARY

Embodiments of the present disclosure may provide a storage controller, a storage system and/or a method of operating a storage controller, capable of high operation speed and/or high reliability.

According to an exemplary embodiment, a storage controller includes a plurality of parallel input channels configured for simultaneously receiving a plurality of data from a plurality of memories, respectively, an error estimation unit, a decision unit, an error correction unit and a selection unit. The error estimation unit generates error information by estimating an error level of the plurality of data. The decision unit performs a logical operation on the plurality of data to generate operation data. The error correction unit generates error correction data by correcting an error of the operation data. The selection unit selects one of the operation data or the error correction data based on the error information.

According to an exemplary embodiment, a storage system includes a storage memory configured to store a plurality of data in a plurality of substantially redundant memory channels, respectively, and a storage controller. The storage controller includes an error estimation unit configured to generate error information by estimating an error level of the plurality of data, a decision unit configured to perform a logical operation on the plurality of data to generate operation data, an error correction unit configured to generate error correction data by correcting an error of the operation data, and a selection unit configured to select one of the operation data or the error correction data based on the error information.

According to an exemplary embodiment, a method of operating a storage controller includes simultaneously receiving a plurality of data from substantially redundant memory channels, respectively, generating error information by estimating an error level of the plurality of data, performing a logical operation on the plurality of data to generate operation data, generating error correction data by correcting an error of the operation data, and selecting one of the operation data or the error correction data based on the error information.

The method may include performing the logical operation of a majority voting operation, a NAND operation, or an OR operation.

The method may include performing the logical operation on the plurality of data to generate hard decision error data, where performing the logical operation includes performing a majority voting operation, where the generating error correction data is based on the hard decision error data.

The method may include performing a second logical operation on the plurality of data to generate soft decision error data, where performing the second logical operation includes performing an XOR operation, where the generating error correction data is based on the soft decision error data.

A storage controller, a storage system and a method of operating the storage controller, according to exemplary embodiments, may efficiently receive a plurality of data corresponding to each of a plurality of memories. In addition, an exemplary embodiment storage controller, a storage system and a method of operating the storage controller may efficiently receive a plurality of data through various paths, prioritizing at least one of reliability or receiving speed.

BRIEF DESCRIPTION OF THE DRAWINGS

Exemplary embodiments of the present disclosure will be more clearly understood from the following detailed description taken in conjunction with the accompanying drawings, in which.

DETAILED DESCRIPTION

Figure 1:
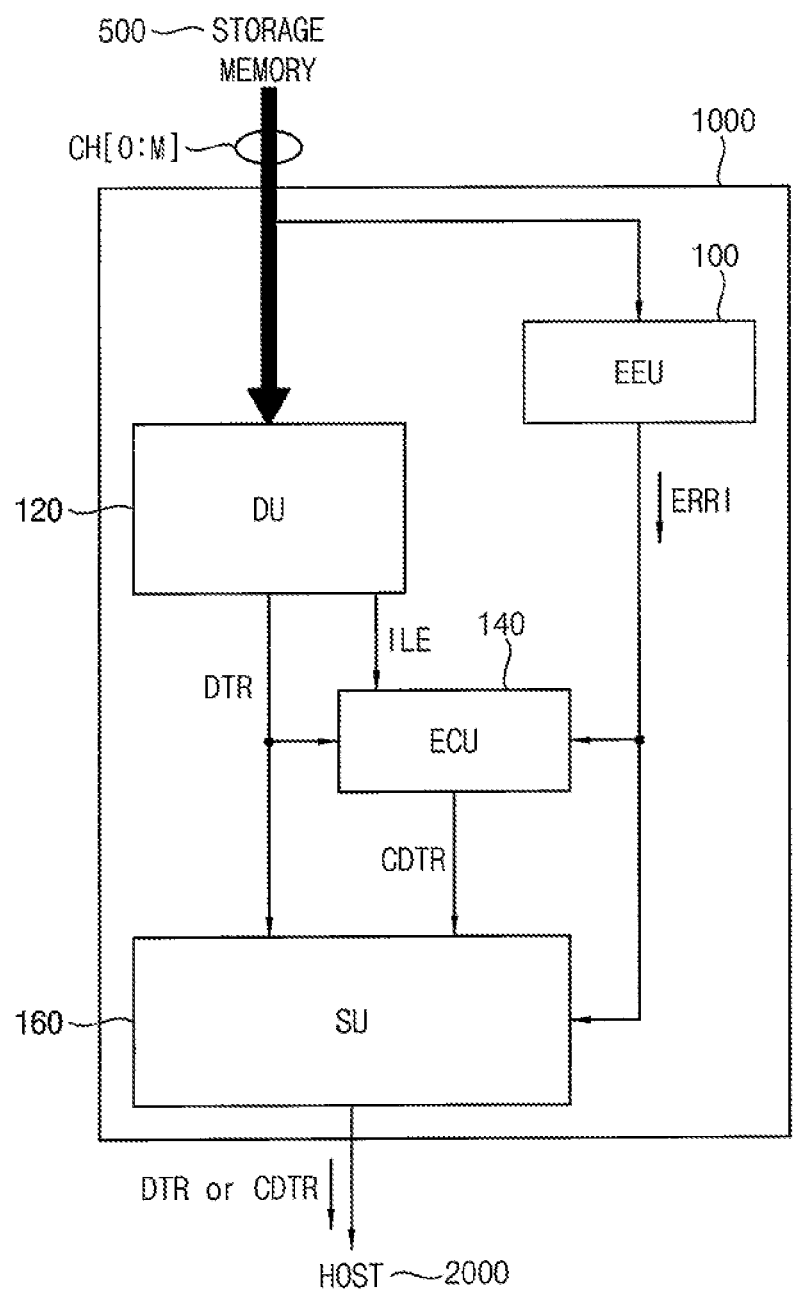
FIG. 1 is a schematic block diagram illustrating a storage controller according to an exemplary embodiment of the present disclosure.

Exemplary embodiments will be described more fully hereinafter with reference to the accompanying drawings, without limitation thereto. In the drawings, like reference numerals may refer to like elements throughout. Duplicate descriptions may be omitted.

FIG. 1 illustrates a storage controller according to exemplary embodiments.

Referring to FIG. 1, a storage system may include a storage controller 1000, a host 2000, and a storage memory 500.

The storage system may constitute a part of an artificial intelligence (AI) system, which may be applied to fields such as safety, transportation, defense, health care, or those having like speed and/or reliability specifications. The storage controller 1000 may store data used by the AI system in the storage memory 500 in response to a write command transmitted from the host 2000, and may receive the data from storage memory 500 in response to a read command transmitted from the host 2000.

Here, the storage memory 500 may include a plurality of memories, and may store data of the same content in a distributed, redundant and/or duplicate form in each of the plurality of memories. For example, the storage memory 500 may include a Redundant Array of Independent Disks (RAID), such as one made of up flash memory channels, but is not limited thereto.

When reading the stored data, the storage controller 1000 may simultaneously receive and utilize the data from the plurality of memories. As such, although some of the duplicated data may include errors, the other duplicated data may be used to correct the errors and thus maintain reliability of the data for the AI system. The storage system may be referred to as a system to which a hardware multiplexing technique is applied. The AI field to which the storage system is applied may be closely related to human life, for example, and maintain high reliability for the data stored in and provided by the storage system.

In the storage system with high speed and/or reliability of data, the storage controller 1000 may include an error estimation unit (EEU) 100, a decision unit (DU) 120, an error correction unit (ECU) 140, and a selection unit (SU) 160.

The error estimation unit 100 and the decision unit 120 may receive the redundantly stored data simultaneously in the form of a bit stream through a plurality of channels (CH[0:M]; where M is a natural number) from each of the plurality of memories. Hereinafter, data received simultaneously in the form of a bit stream from each of the plurality of memories may be referred to as 'a plurality of data'. Each of the plurality of data generally includes corresponding bits in the same bit locations. When there is no error in the plurality of data, values of the corresponding bits have the same value. However, when an error exists in the plurality of data, values of the corresponding bits may be different from each other.

The error estimation unit 100 may estimate an error level of the plurality of data, based on the plurality of data, and generate error information ERRI as a result of the estimation. Errors in the plurality of data may increase as the number of repeated program/erasure (P/E) cycles of memory cells (e.g., flash memory cells) is increased, the memory cells in the program state were repeatedly read, or the memory cells are neglected for a long time after being programmed.

The error information ERRI is set to have a first logic value when the error level of the plurality of data is estimated to be higher than a preset level, and a second logic value when the error level of the plurality of data is estimated to be lower than the preset level, without limitation.

The error estimation unit 100 may transmit error information ERRI to the error correction unit 140 and the selection unit 160. The error information ERRI may be further described farther below with reference to FIGS. 2 and 8.

The decision unit 120 may generate operation data DTR by performing a logical operation on the plurality of data. The logical operation may be performed based on corresponding bits of each of the plurality of data. The logical operation may be performed to quickly correct an error existing in the plurality of data, when the error level of the plurality of data is relatively low so a higher-level correction need not be performed by the error correction unit 140.

Furthermore, the decision unit 120 may generate decision error data ILE based on the plurality of data. The decision error data ILE may indicate locations where uncorrected errors may be relatively more likely to exist in the operation data after or despite the logical operation being performed. Exemplary embodiments of the configuration of the decision unit 120 may be described farther below.

The error correction unit 140 may receive the operation data DTR from the decision unit 120. The error correction unit 140 may correct uncorrected errors existing in the operation data DTR to generate error correction data CDTR. The error correction unit 140 may use various error correction code (ECC) or like schemes in correcting the errors.

The error correction unit 140 may receive the decision error data ILE from the decision unit 120. The error correction unit 140 corrects errors existing in the operation data DTR based on the locations where uncorrected errors are likely to exist, based on the decision error data ILE, to generate error correction data CDTR.

The error correction unit 140 may receive error information ERRI from the error estimation unit 100. The error correction unit 140 may be enabled or disabled based on the error information ERRI. According to an embodiment, when the error information ERRI has a first logic value, the error correction unit 140 may be enabled to generate error correction data CDTR, and when the error information ERRI has a second logic value, the error correction unit 140 may be disabled so as not to generate the error correction data CDTR. However, the scope of the present disclosure is not limited thereto.

In an alternate embodiment, the error information ERRI may be a digital rather than logical valued signal, and/or may have more than two possible values. For example, a first value of ERRI may dictate the unconditional use of DTR, a second value of ERRI may dictate the unconditional use of CDTR, and a third value of ERRI may dictate the use of DTR or CDTR based on a value of ILE. In such an embodiment, the ECU 140 may output DTR as CDTR based on ERRI and ILE, or otherwise output CDTR.

The selection unit 160 may receive the operation data DTR from the decision unit 120, the error correction data CDTR from the error correction unit 140, and the error information ERRI from the error estimator 100.

The selection unit 160 may select one of the operation data DTR and the error correction data CDTR based on the error information ERRI and output the selected data to the host 2000. According to an embodiment, when the error information ERRI has a first logical value, the selection unit 160 selects the error correction data CDTR and when the error information ERRI has a second logical value, the selection unit 160 selects the operation data DTR. However, the scope of the present disclosure is not limited thereto.

Figure 2:
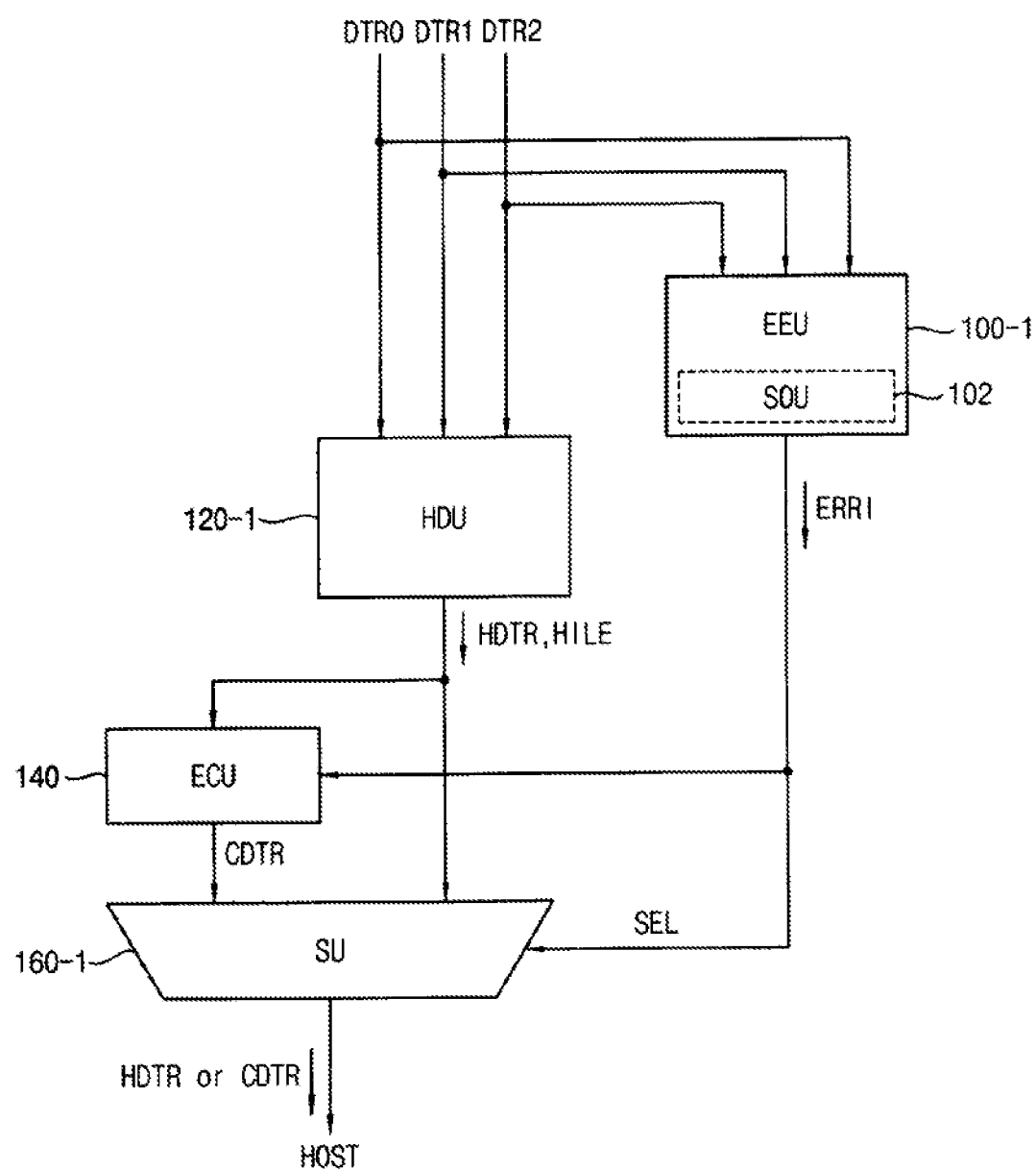
FIG. 2 is a schematic block diagram illustrating a storage controller according to an exemplary embodiment of the present disclosure.

FIG. 2 illustrates a storage controller according to an embodiment of the present disclosure.

Referring to FIGS. 1 and 2, a storage controller 1000-1 includes an error estimation unit 100-1, a hard decision unit 120-1, an error correction unit 140, and a selection unit 160-1.

The components having the same reference numerals in FIGS. 1 and 2 perform similar functions, and redundant descriptions may be omitted.

The error estimation unit 100-1 and the hard decision unit 120-1 may simultaneously receive a plurality of data DTR0, DTR1, and DTR2 representing the same information through a plurality of channels CH[0], CH[1], and CH[2] in the form of a bit stream. Here, the data DTR0 is data received through the channel CH [0], the data DTR 1 is data received through the channel CH [1], and the data DTR2 is the channel CH[2]. Although only three channels CH[0], CH[1], and CH[2] are shown in FIG. 2, the number of channels is exemplary for convenience of description, and the scope of the present disclosure is not limited thereto.

The error estimator 100-1 estimates an error level of the plurality of data DTR0, DTR1, and DTR2 based on the plurality of data DTR0, DTR1, and DTR2, and provides error information ERRI as a result of the estimation.

When the error level of the plurality of data DTR0, DTR1, and DTR2 is estimated to be equal to or higher than a preset level, the error information ERRI is set to have a first logical value; and when the error level is estimated to be less than the preset level, the error information ERRI is set to have a second logical value. According to an embodiment, the estimation of the error level may be performed by examining corresponding bits of data DTR0, DTR1, and DTR2 in units of one bit. However, according to an alternate embodiment, the estimation of the error level may be performed by examining in units of multiple bits.

The error estimation unit 100-1 may further include other components to estimate the error level. According to an embodiment, the error estimation unit 100-1 may further include a syndrome operation unit 102. In this case, the error estimation unit 100-1 may estimate the error level based on syndrome data generated by the syndrome operation unit 102.

The hard decision unit 120-1 may perform a logical operation on a plurality of data DTR0, DTR1, and DTR2 to generate hard decision operation data HDTR. The logical operation may be performed based on corresponding bits of each of the plurality of data DTR0, DTR1, and DTR2. The logical operation may be performed to quickly correct an error existing in a plurality of data DTR0, DTR1, and DTR2, although it need not reach the level of correction capable of being performed by the error correction unit 140.

The hard decision unit 120-1 may include a gate circuit including a plurality of logic gates to perform the logic operation. Hereinafter, the process of performing the logical operation by an embodiment of the hard decision unit 120-1 of FIG. 2 may be described in greater detail.

Figure 3:
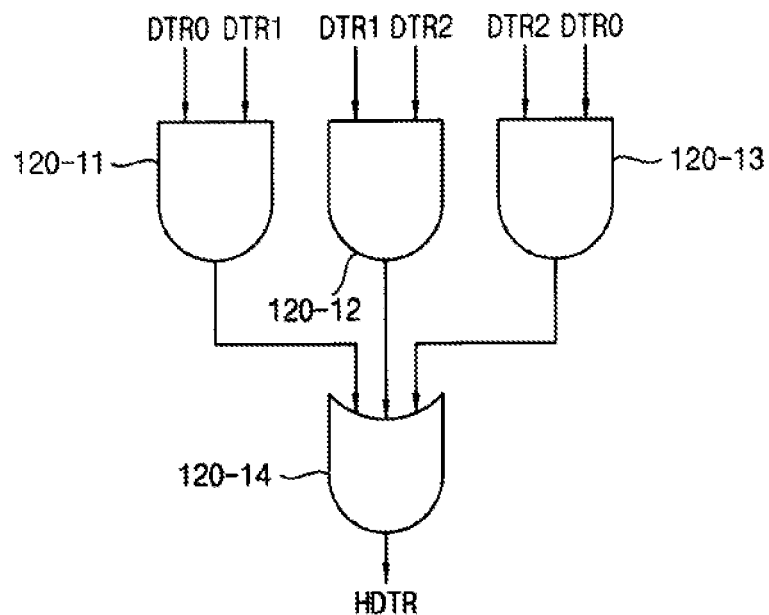
FIG. 3 is a schematic circuit diagram illustrating an exemplary embodiment gate circuit included in the hard decision unit of FIG. 2.
Figure 4:
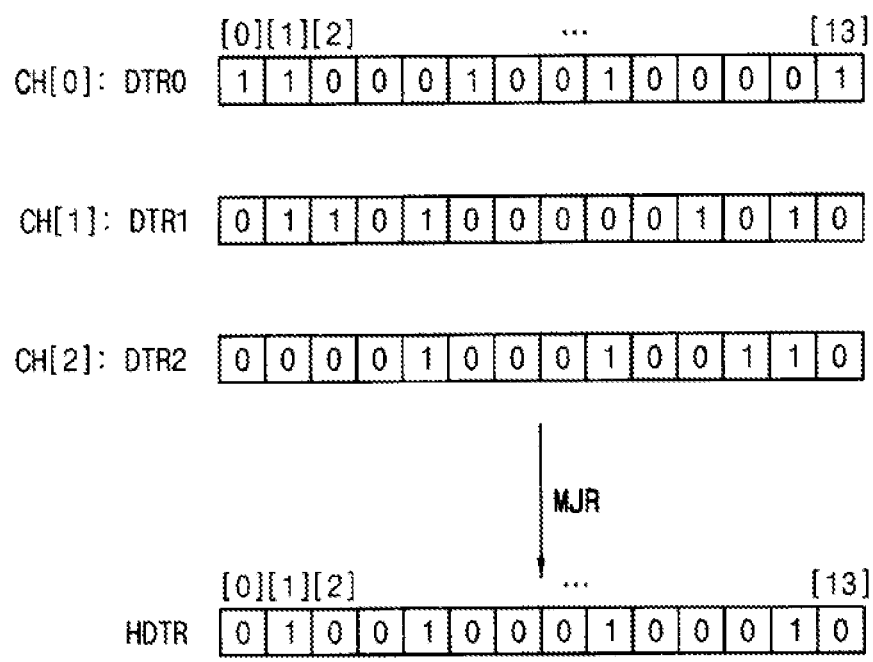
FIG. 4 is a data diagram for explaining a logic operation performed by the gate circuit of FIG. 3.

FIG. 3 illustrates an exemplary embodiment of a gate circuit that may be included in the hard decision unit of FIG. 2; and FIG. 4 is used for explaining a logic operation performed by the gate circuit of FIG. 3.

Referring to FIG. 3, a gate circuit 120-1a may include a majority voting circuit that implements a Boolean logic majority function or median operator. According to an embodiment, the majority voting circuit may include logical AND gates 120-11, 120-12 and 120-13, and a logical OR gate 120-14. In an alternate embodiment, each of these gates may be replaced with a NAND gate.

The gate 120-11 receives data DTR0 and DTR1 to perform a logical AND operation, and the gate 120-12 receives data DTR1 and DTR2 to perform a logical AND operation, and the gate 120-13 receives data DTR2 and DTR0 to perform a logical AND operation. The gate 120-14 may perform a logical OR operation by receiving a result of performing the logical AND operation of each of the gates 120-11, 120-12, and 120-13. According to an embodiment, the gate circuit 120-1a may perform a majority voting logical operation based on the corresponding bits, e.g., DTR0[k], DTR1[k], and DTR2[k]; where k is an integer greater than or equal to 0, of the plurality of data DTR0, DTR1, and DTR2. The majority voting logic operation is based on an empirical fact that it is far less likely for an error to occur in a majority of the bits DTR0[k], DTR1[k], and DTR2[k].

The bits DTR0[k], DTR1[k], and DTR2[k] may have a first value or a second value. According to an embodiment, the first value is '1', and the second value is '0'. According to an alternate embodiment, the first value may be '0', and the second value may be '1'.

FIG. 4 illustrates the result of a majority voting logic operation MJR performed by the gate circuit 120-1 based on the corresponding bits of a plurality of data.

Referring to FIGS. 3 and 4, a gate circuit 120-1a sets a bit value of hard decision operation data to a first value when bits having the first value among the corresponding bits DTR0[k], DTR1[k], and DTR2[k] outnumber the bits having the second value among the corresponding bits DTR0 [k], DTR1[k], and DTR2[k]. Gate circuit 120-1a sets a bit value of hard decision operation data to the second value when bits having the second value among the corresponding bits DTR0[k], DTR1[k], and DTR2[k] outnumber the bits having the first value among the corresponding bits DTR0 [k], DTR1[k], and DTR2[k]. That is, the gate circuit 120-1a may partially correct an error existing in the plurality of data DTR0, DTR1, and DTR2 as a result of performing the majority voting logic operation on the corresponding bits DTR0[k], DTR1[k], and DTR2[k].

Figure 5:
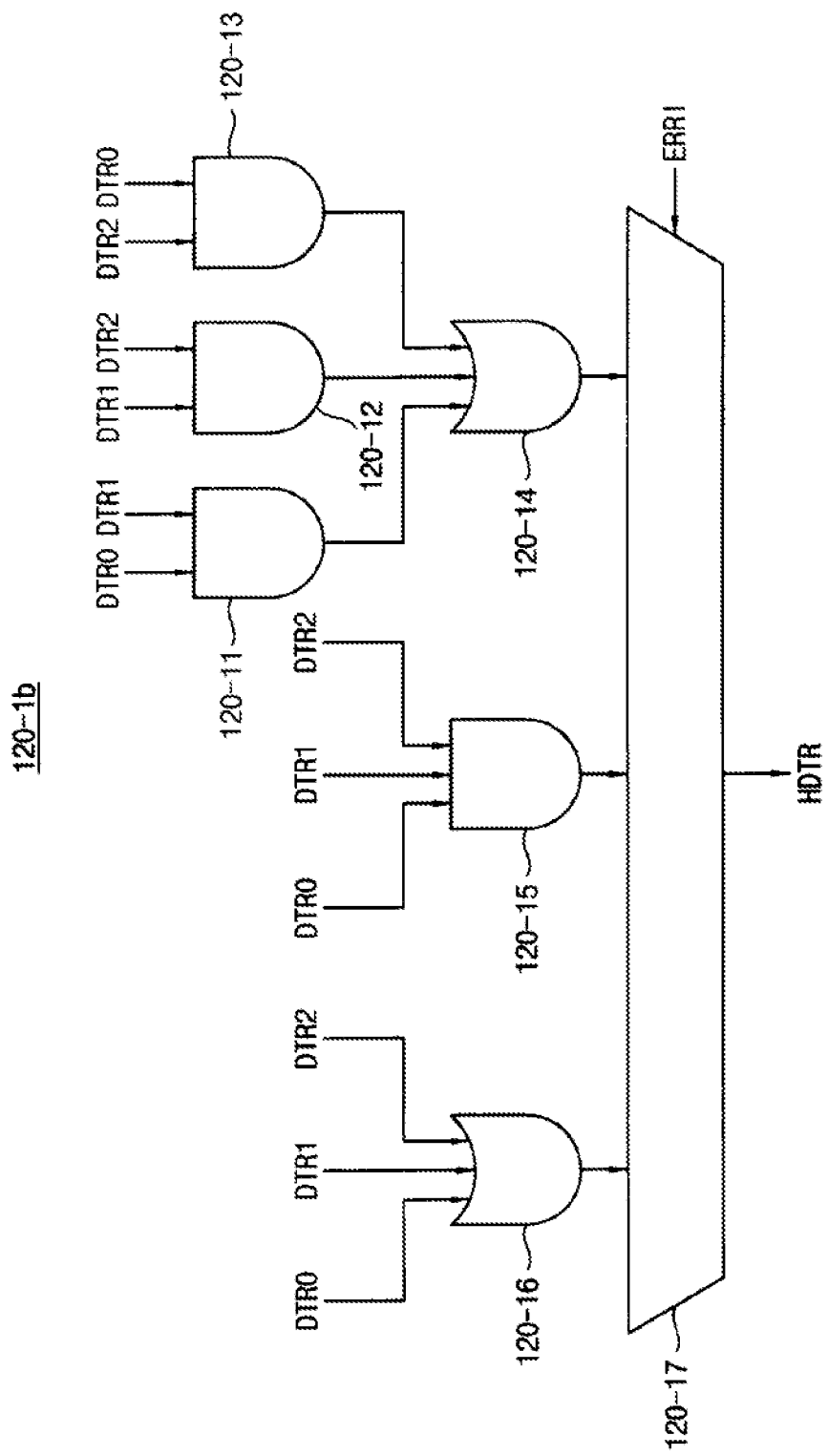
FIG. 5 is a schematic circuit diagram illustrating an exemplary embodiment gate circuit included in the hard decision unit of FIG. 2.

FIG. 5 illustrates an exemplary embodiment of a gate circuit that may be included in the hard decision unit of FIG. 2.

Referring to FIG. 5, the gate circuit 120-1b may include a logical OR circuit, a logical AND circuit, and a majority voting circuit. According to an embodiment, the logical OR circuit includes a logical OR gate 120-16; the logical AND circuit includes a logical AND gate 120-15; and the majority voting circuit includes logical AND gates 120-11, 120-12 and 120-13, and the logical OR gate 120-14. Here, the gate 120-16 receives a plurality of data DTR0, DTR1, and DTR2 to perform a logical OR operation, and the gate 12-15 receives the plurality of data DTR0, DTR1, and DTR2 to perform a logical AND operation. The majority voting logic operation has been described above with reference to FIG. 4, so redundant description may be omitted.

The gate circuit 120-1b may perform any one or more of a logical OR operation, a logical AND operation, and a majority voting logic operation based on the corresponding bits, e.g., DTR0[k], DTR1[k], and DTR2[k]; where k is an integer greater than or equal to 0, of the plurality of data DTR0, DTR1, and DTR2.

The logical OR operation may be performed when it is estimated that an error, hereinafter referred to as a 'first error', existing in the plurality of data DTR0, DTR1, and DTR2 may have occurred because the number of repeatable program/erase P/E was exceeded, the memory cells in the program state were continuously read, or it was beyond the limits of an ability of memory cells to reliably preserve data after being programmed a long time earlier.

The logical AND operation may be performed when it is estimated that an error, hereinafter referred to as a 'second error', existing in the plurality of data DTR0, DTR1, and DTR2 may have occurred because it was beyond the limits of an ability of memory cells to reliably preserve data after being programmed a long time earlier. Hereinafter, the logical OR operation and the logical AND operation may be described in more detail.

Figures 6A, 6B:
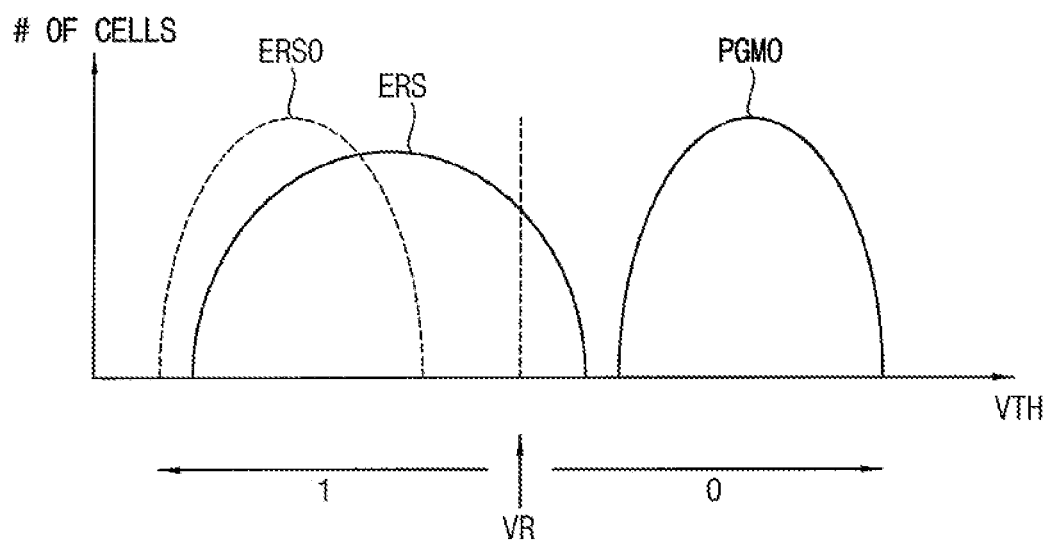
FIG. 6A is a graphical diagram for describing a logical operation performed by a logical OR circuit included in the gate circuit of FIG. 5.
FIG. 6B is a data diagram for describing the logical operation performed by the logical OR circuit included in the gate circuit of FIG. 5.
Figure 7A:
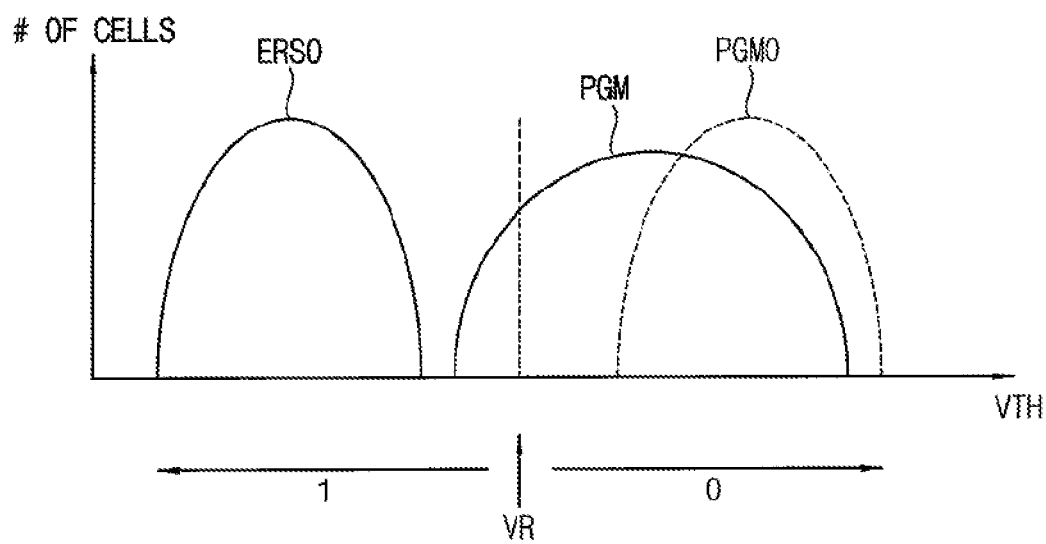
FIG. 7A is a graphical diagram for explaining a logical operation performed by the logical AND circuit of FIG. 5.
Figure 7B:
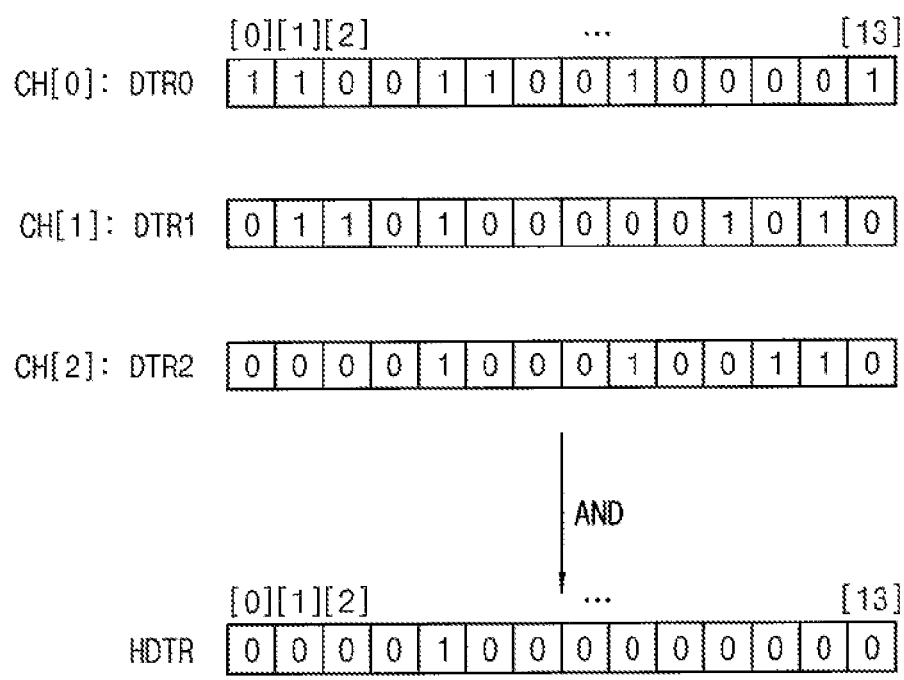
FIG. 7B is a data diagram for explaining the logical operation performed by the logical AND circuit of FIG. 5.

FIGS. 6A and 6B are used for describing a logical operation performed by a logical OR circuit included in the gate circuit of FIG. 5. FIGS. 7A and 7B are used for explaining a logical operation performed by the logical AND circuit of FIG. 5.

Referring to FIG. 6A, when the plurality of data DTR0, DTR1, and DTR2 are stored in a NAND cell, a distribution of the original erased state ERS0 of the NAND cell may be changed to the distribution of the deteriorated state ERS shifted towards the right. Here, the horizontal axis represents the threshold voltage VTH of the NAND cell, and the vertical axis represents the number of NAND cells having the threshold voltage VTH. Such variation in the distribution of the NAND cell may occur when the P/E cycle is repeated, or when a read disturb occurs as a repeated read operation is performed with respect to memory cells in a program state.

FIG. 6B illustrates the result of a logical OR operation when the gate circuit 120-1b performs the logical OR operation based on the corresponding bits, e.g., DTR0[k], DTR1[k], and DTR2[k]; where k is an integer greater than or equal to 0, of the plurality of data DTR0, DTR1, and DTR2. The gate circuit 120-1b may partially detect or correct the first error existing in the plurality of data DTR0, DTR1, and DTR2 as a result of performing the logical OR operation on the corresponding bits DTR0[k], DTR1 [k], and DTR2[k].

Referring to FIG. 7A, when the plurality of data DTR0, DTR1, and DTR2 are stored in a NAND cell, a distribution of the original programmed state PGM0 of the NAND cell may be changed to the distribution of the deteriorated state PGM shifted towards the left. Here, the horizontal axis represents the threshold voltage VTH of the NAND cell, and the vertical axis represents the number of NAND cells having the threshold voltage VTH. Such variation in the distribution of the NAND cell may occur when the memory cells are out of the time limit of reliable data retention due to a long delay after the program operation.

FIG. 7B illustrates the result of a logical AND operation when the gate circuit 120-1b performs the logical AND operation based on the corresponding bits DTR0[k], DTR1 [k], and DTR2[k]; where k is an integer greater than or equal to 0, of the plurality of data DTR0, DTR1, and DTR2. That is, the gate circuit 120-1b may partially detect or correct the second error existing in the plurality of data DTR0, DTR1, and DTR2 as a result of performing the logical AND operation on the corresponding bits DTR0[k], DTR1 [k], and DTR2[k].

Referring back to FIG. 2, the hard decision unit 120-1 may generate hard decision error data HILE based on the plurality of data DTR0, DTR1, and DTR2.

The hard decision error data HILE may include data that indicates locations where uncorrected errors are likely to exist in the hard decision operation data HDTR despite the logical operations being performed, as a bit corresponding to a bit of hard decision operation data HDTR. According to an embodiment, the hard decision unit 120-1 may set a bit value of the hard decision error data HILE to a first logical value when the corresponding bits DTR0[k], DTR1 [k], and DTR2[k] have both of the first value and a second value and when a difference between a number of bits having the first value among the corresponding bits DTR0[k], DTR1 [k], and DTR2[k] and a number of bits having the second value among the corresponding bits DTR0[k], DTR1 [k], and DTR2[k] is equal to or less than a predetermined value. For example, in the exemplary embodiment of FIG. 4, assuming that the first value is '1', the second value is '0', the predetermined value is '1', and the first logical value is '1', value of bits of the hard decision error data HILE may be set as HILE[0:13]=(1,1,1,0,1,1,0,0,1,0,1,1,1,1). That is, 10 of the 14 bits were not unanimous between the three exemplary channels.

The error correction unit 140 may receive the hard decision operation data HDTR and the hard decision error data HILE from the hard decision unit 120. The error correction unit 140 may correct errors existing in the hard decision operation data HDTR using the locations where uncorrected errors are likely to exist based on the hard decision error data HILE, and generate error correction data CDTR.

The error correction unit 140 may receive error information ERRI from the error estimation unit 100-1. The error correction unit 140 may be enabled or disabled based on the error information ERRI. According to an embodiment, when the error information ERRI has a first logic value, the error correction unit 140 is enabled to generate error correction data CDTR; and when the error information ERRI has a second logic value, the error correction unit 140 is disabled not to generate the error correction data CDTR. However, the scope of the present disclosure is not limited thereto. In an alternate embodiment, the output CDTR of the error correction unit 140 may be used or ignored by the SU 160 based on the error information ERRI.

Figure 8:
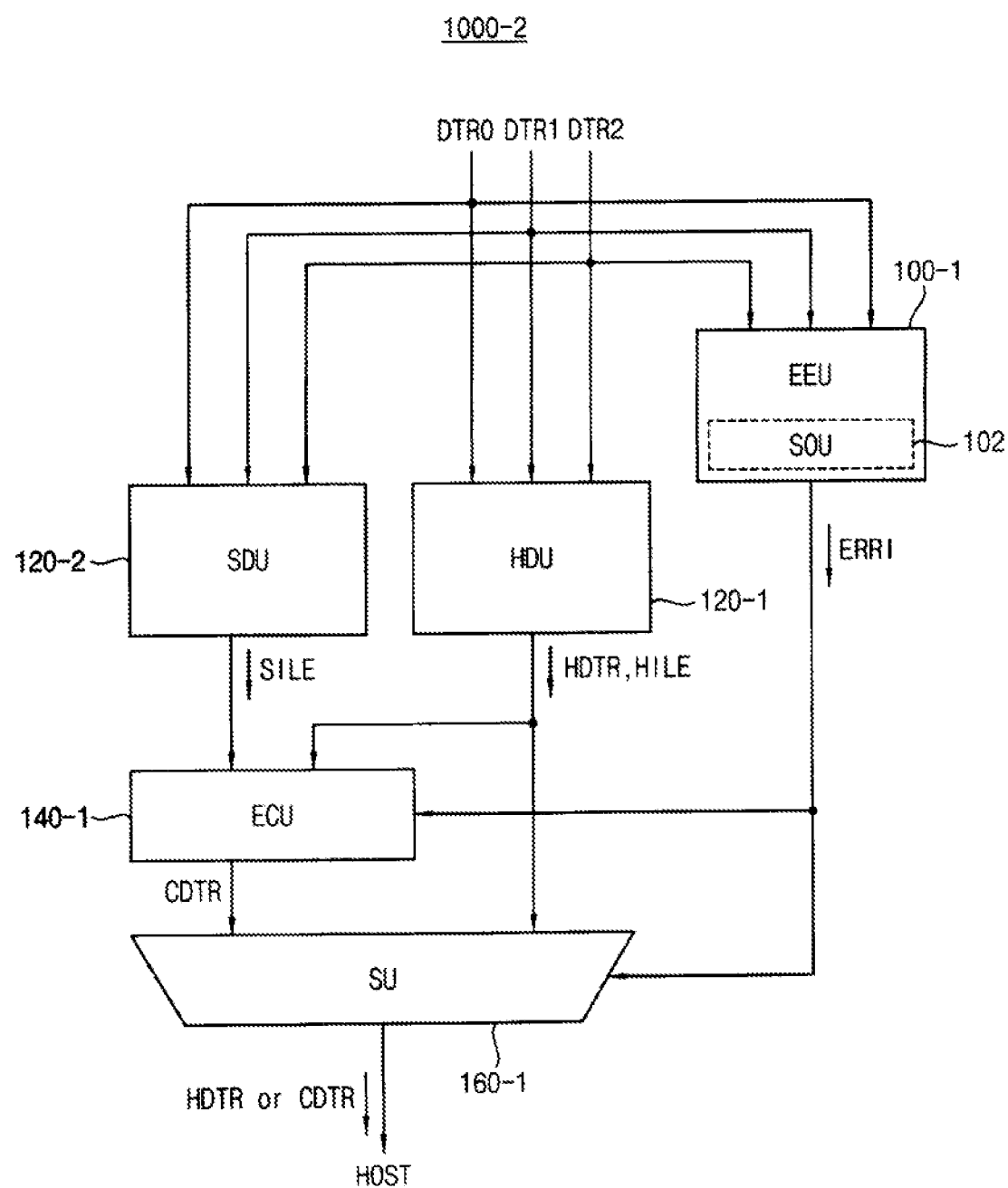
FIG. 8 is a schematic block diagram illustrating a storage controller according to an exemplary embodiment of the present disclosure.

FIG. 8 illustrates a storage controller according to an embodiment of the present disclosure.

Referring to FIGS. 1, 2, and 8, the storage controller 1000-2 includes an error estimation unit 100-1, a hard decision unit 120-1, a soft decision unit 120-2, an error correction unit 140-1, and a selection unit 160-1. The storage controller 1000-2 illustrated in FIG. 8, unlike the storage controller 1000-1 illustrated in FIG. 2, may further include the soft decision unit 120-2. The components having the same reference numerals in FIGS. 2 and 8 perform similar functions, so redundant descriptions may be omitted.

The soft decision unit 120-2 may simultaneously receive a plurality of data DTR0, DTR1, and DTR2 representing the same information through a plurality of channels CH[0], CH[1], and CH[2], each in the form of a bit stream.

The soft decision unit 120-2 may generate soft decision error data SILE by performing logical operations on the plurality of data DTR0, DTR1, and DTR2.

The logical operations may be performed to quickly correct an error existing in the plurality of data DTR0, DTR1, and DTR2, even though it need not reach the level of correction capable of being performed by the error correction unit 140-1.

The soft decision unit 120-2 may include a gate circuit including a plurality of gates to perform the logic operations. Hereinafter, the process of performing the logical operations by the soft decision unit 120-2 may be described in greater detail.

Figure 9:
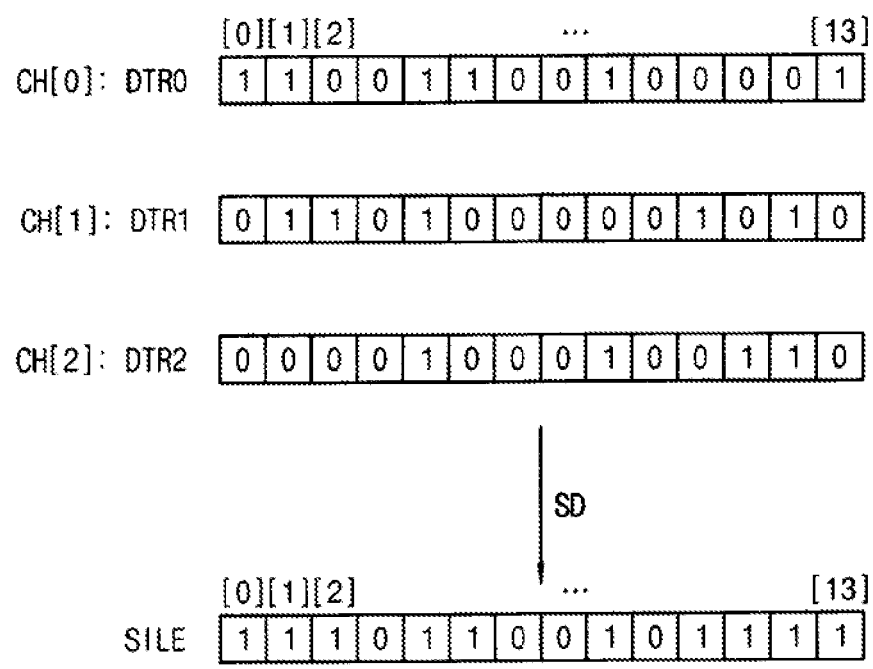
FIG. 9 is a data diagram for describing logical operations performed by the soft decision unit of FIG. 8.

FIG. 9 is used for describing logical operations performed by the soft decision unit of FIG. 8.

In FIG. 9, the result of the soft decision unit 120-2 performing logic operations based on bits corresponding to the plurality of data DTR0, DTR1, and DTR2 is illustrated. According to an embodiment, the soft decision unit 120-2 may set a bit value of the soft decision error data SILE to a first logical value when the corresponding bits DTR0[k], DTR1 [k], and DTR2[k] have both of a first value and a second value. For example, in the exemplary embodiment of FIG. 9, assuming that the first value is '1', the second value is '0', the first logical value is '1', value of bits of the soft decision error data SILE may be set as SILE[0:13]=(1,1,1, 0,1,1,0,0,1,0,1,1,1,1,). That is, the soft decision (SD) unit 120-2 may perform a logical exclusive OR (XOR) operation based on bits corresponding to the plurality of data, but is not limited thereto.

Referring back to FIG. 8, the error correction unit 140-1 may receive the hard decision operation data HDTR and the hard decision error data HILE from the hard decision unit 120-1. The error correction unit 140-1 may further receive the soft decision error data SILE form the soft decision unit 120-2.

The error correction unit 140-1 may correct errors existing in the hard decision operation data HDTR for locations where uncorrected errors are likely to exist based on the hard decision error data HILE and the soft decision error data SILE to generate error correction data CDTR.

Figure 10:
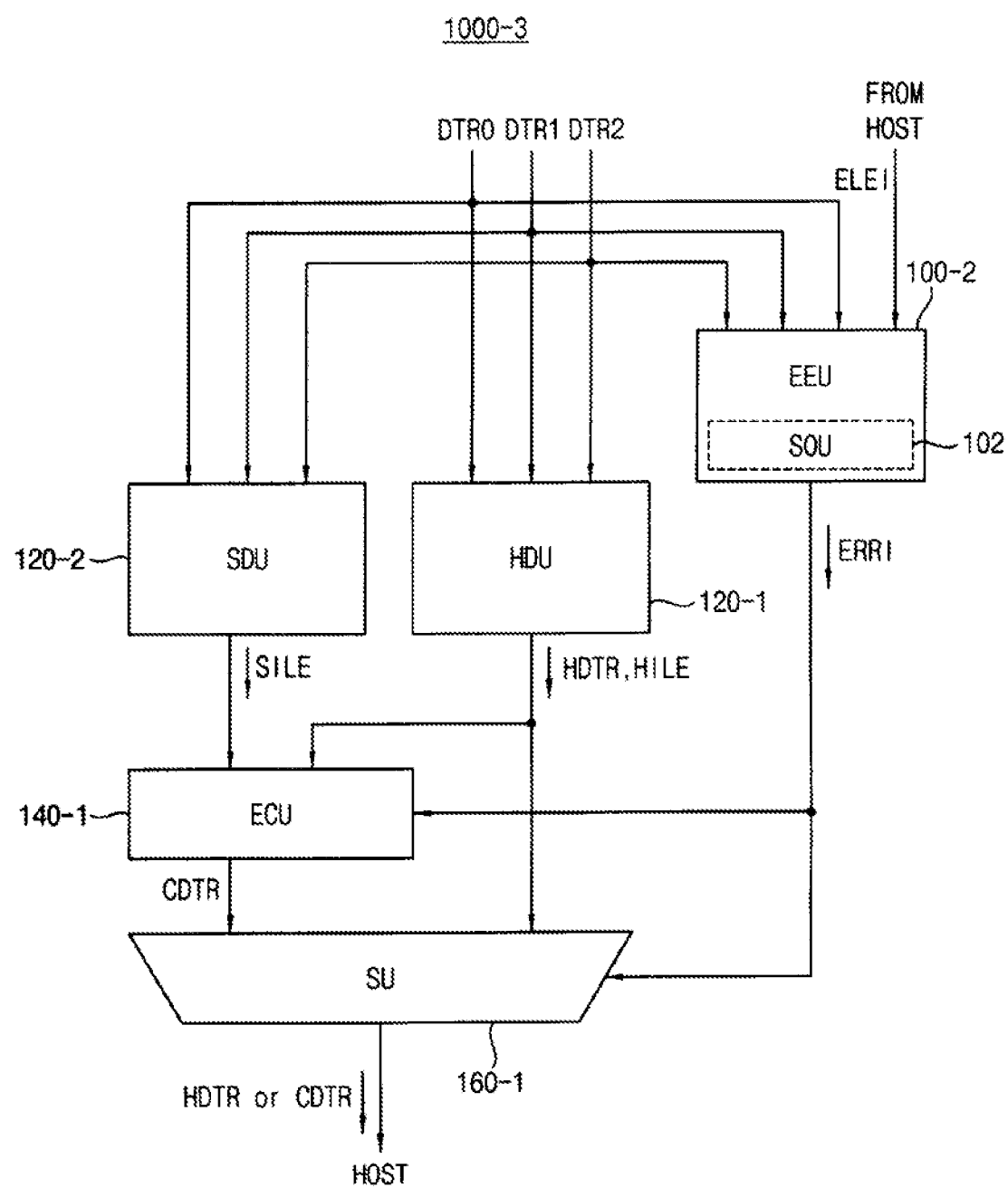
FIG. 10 is a schematic block diagram illustrating a storage controller according to an exemplary embodiment of the present disclosure.

FIG. 10 illustrates a storage controller according to an embodiment of the present disclosure.

Referring to FIGS. 1, 8, and 10, the storage controller 1000-3 includes an error estimation unit 100-2, a hard decision unit 120-1, a soft decision unit 120-2, an error correction unit 140-1, and a selection unit 160-1. The error estimation unit 100-2, unlike the error estimation unit 100-1 shown in FIG. 8, may further receive from the host information ELEI for estimating an error level of the plurality of data DTR0, DTR1, and DTR2. Here, the information ELEI may be information that is related to a storage memory, and may be accumulated while the storage memory is operating after the storage controller and the storage memory are established in a storage system.

Figure 11:
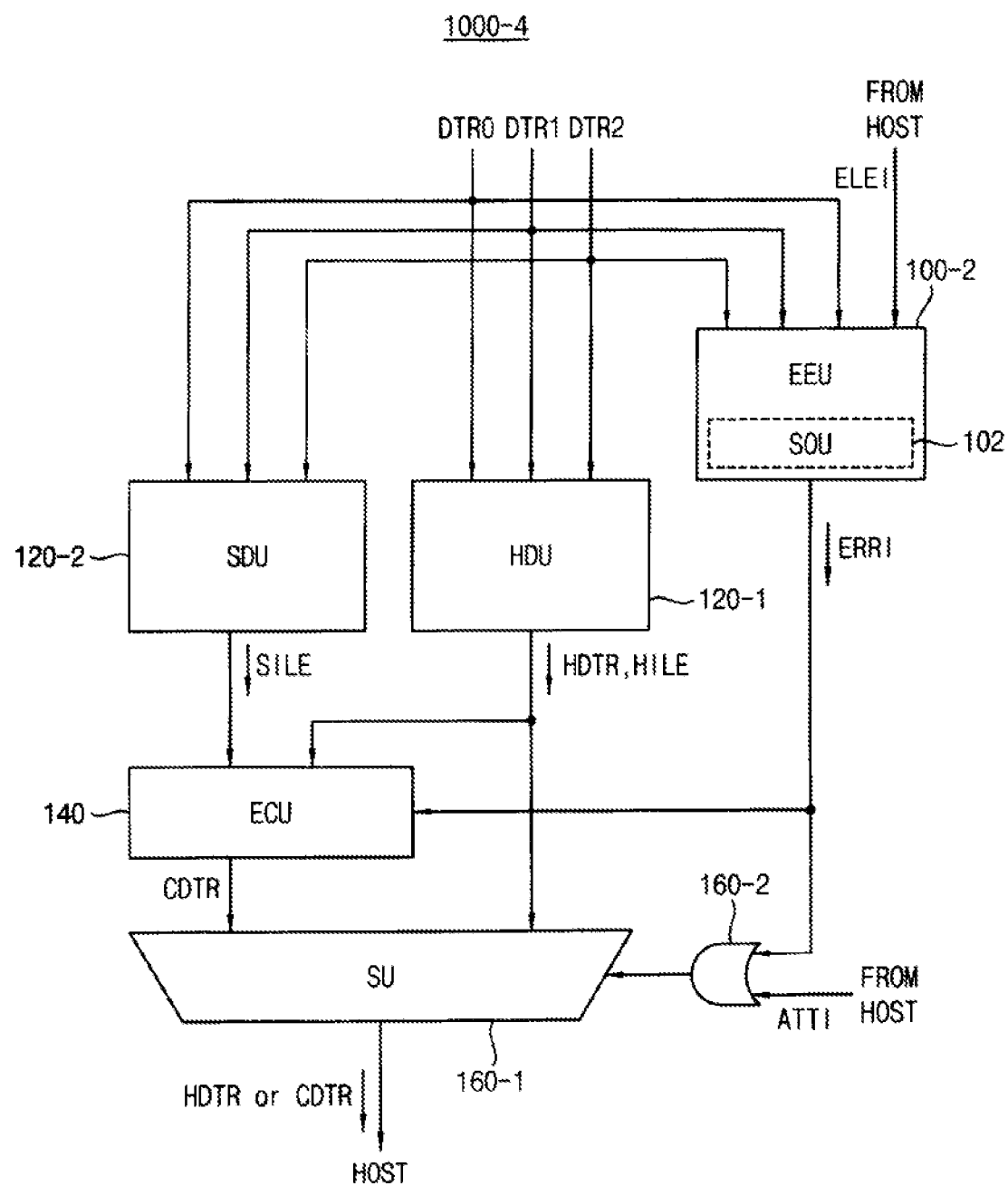
FIG. 11 is a schematic block diagram illustrating a storage controller according to an exemplary embodiment of the present disclosure.

FIG. 11 illustrates a storage controller according to an embodiment of the present disclosure.

Referring to FIGS. 10 and 11, the storage controller 1000-4 includes an error estimation unit 100-2, a hard decision unit 120-1, a soft decision unit 120-2, an error correction unit 140-1, a selection unit 160-1, and a logical OR gate 160-2. The storage controller 1000-4 illustrated in FIG. 11, unlike the storage controller 1000-3 illustrated in FIG. 10, may further include the logical OR gate 160-2. The components having the same reference numerals in FIGS. 10 and 11 perform similar functions, so redundant descriptions may be omitted.

The logical OR gate 160-2 may receive error information ERRI from the error estimation unit 100-2 and receive attention information ATTI from the host. The attention information ATTI may be information sensed by the host 2000 and transmitted to the storage controller 1000-4 when a storage system including a host 2000, the storage controller 1000-4, and a storage memory 500 operates in an emergency situation in which a high degree of speed or promptness is required. According to an embodiment, the logical OR gate 160-2 may allow the selection unit 160-1 to select hard decision operation data HDTR regardless of the error information ERRI when the attention information indicates that the error level or rate of the plurality of data is lower than a reference value.

Figure 12:
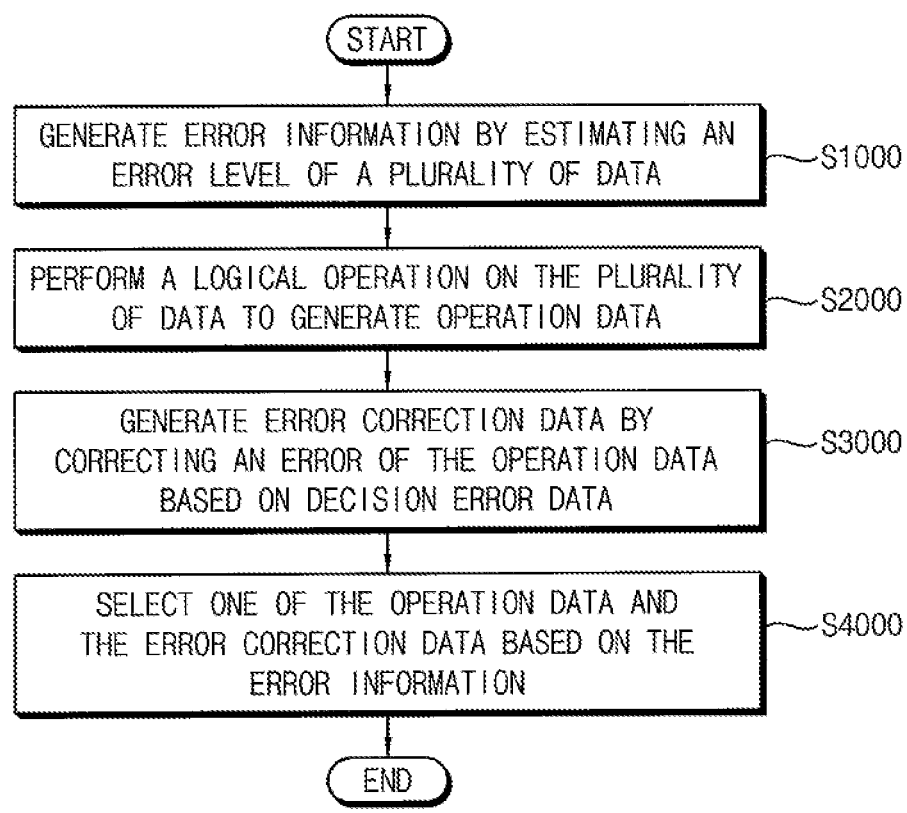
FIG. 12 is a flowchart diagram illustrating a method of operating a storage controller according to an exemplary embodiment of the present disclosure.

FIG. 12 illustrates a method of operating a storage controller according to an exemplary embodiment.

Referring to FIGS. 1 and 12, the error estimator 100 may generate error information ERRI by estimating an error level of a plurality of data at function block S1000. The decision unit 120 may perform a logical operation on the plurality of data to generate operation data DTR at function block S2000. The error correction unit 140 may generate error correction data CDTR by correcting an error of the operation data DTR based on decision error data ILE at function block S3000. The selection unit 160 may select one of the operation data DTR or the error correction data CDTR based on the error information ERRI at function block S4000.

Figure 13:
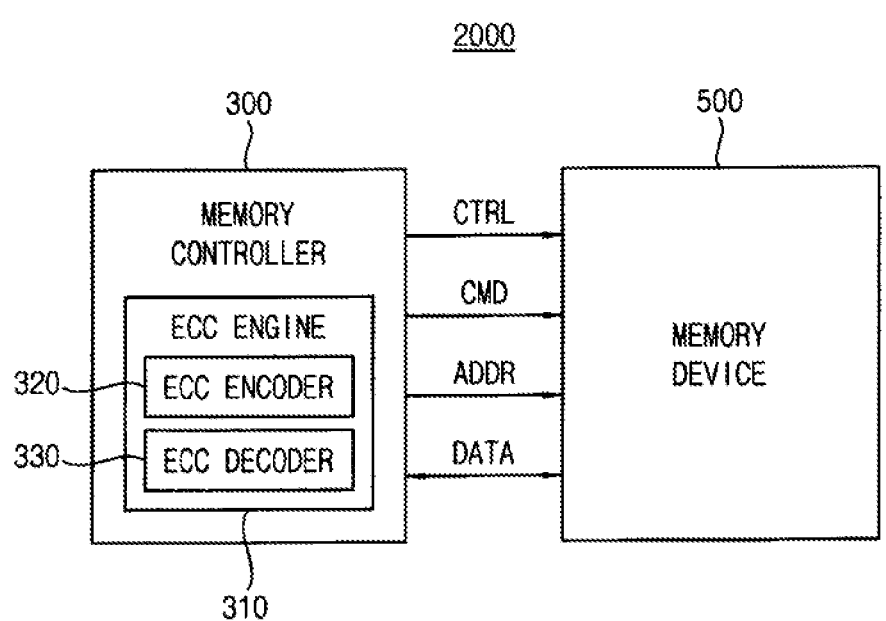
FIG. 13 is a schematic block diagram illustrating a memory system according to an exemplary embodiment of the present disclosure.

FIG. 13 illustrates a memory system according to an exemplary embodiment.

Referring to FIG. 13, a memory system may include a memory controller 300 and at least one memory device 500.

The memory device 500 may perform read, write and erase operations under control of the memory controller 300. The memory device 500 may receive control signals CTRL, commands CMD, addresses ADDR and write data DATA from the memory controller 300 and transmit read data DATA to the memory controller 300.

The memory controller 300 may include an ECC engine 310. The ECC engine 310 may include an ECC encoder 320 and an ECC decoder 330, such as but not limited to that illustrated in FIG. 4, to check and correct error bits or fail bits. The ECC engine 310 may perform the ECC operation on data units of the ECC sectors. For example, the data unit of a page may be 8 KB though 64 KB and the data unit of the ECC sector may be 1 KB through 4 KB, respectively.

The ECC encoder 320 may perform error correction encoding of the data to be provided to the memory device 500 to generate a codeword including parity bits. The codeword may be transferred to and stored in a plurality of storage regions of the memory device 500. The ECC encoder 320 may perform the encoding by data units of ECC sectors.

The ECC decoder 330 may perform error correction decoding of the data read out from the memory device 500 and determine failure or success of the error correction decoding. The ECC decoder 330 may correct the error bits of the data using the parity bits in the codeword. If the error bit number exceeds the threshold number or the correctible bit number, the ECC decoder 330 does not correct the error bits and the error correction is incomplete. According to an exemplary embodiment, the ECC decoder 330 may provide logic operation data by performing a logic operation on a plurality of read data that are read out from the plurality of storage regions, and perform a combined ECC decoding based on the logic operation data.

As non-limiting examples, the ECC encoder 320 and the ECC decoder 330 may check and correct bit errors using coded modulations such as low density parity check (LDPC) code, Bose, Chaudhuri, Hocquenghem (BCH) code, turbo code, Reed-Solomon code (RSC), convolution code, recursive systematic code, trellis-coded modulation (TCM), block coded modulation (BCM), or the like.

Figure 14:
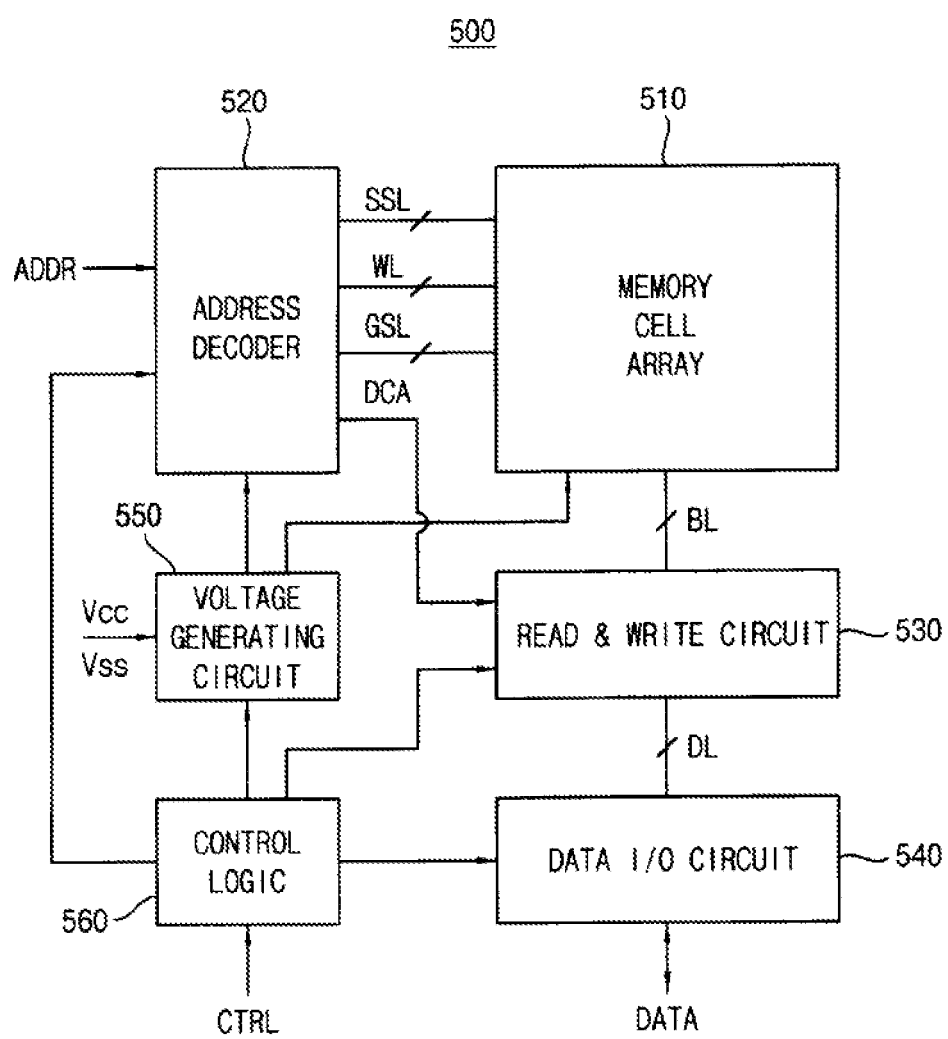
FIG. 14 is a schematic block diagram illustrating an exemplary embodiment of a memory device included in the memory system of FIG. 13.

FIG. 14 illustrates an exemplary embodiment of a storage memory of FIG. 1 or memory device included in the memory system of FIG. 13.

Referring to FIG. 14, a memory device 500 includes a memory cell array 510, an address decoder 520, a read-write circuit 530, a data input/output (I/O) circuit 540, a voltage generating circuit 550, and control logic or circuit 560. The memory device 500 includes nonvolatile storage memory.

The memory cell array 510 is connected to the address decoder 520 through word lines WL and selection lines. For example, the selection lines may include string selection lines SSL and ground selection lines GSL. The memory cell array 510 is connected to the read-write circuit 530 through bit lines BL.

The memory cell array 510 may include a plurality of memory cells. For example, the memory cell array 510 may include memory cells disposed along row and column directions. For example, the memory cell array 510 may include a plurality of memory cells, each cell storing one or more data bits. The memory cell array may further have a vertical NAND (VNAND) flash memory structure.

The address decoder 520 is configured to operate in response to a control signal of the control logic 560. The address decoder 520 may receive addresses ADDR from an external device, such as a memory controller.

The address decoder 520 is configured to decode a row address among the received addresses ADDR. The address decoder 520 is configured to select a word line corresponding to the decoded row address among the word lines WL. The address decoder 520 is configured to select selection lines corresponding to the decoded row address among the selection lines including string selection lines SSL and ground selection lines GSL.

The address decoder 520 is configured to deliver various voltages received from the voltage generating circuit 550 to the selected word line, unselected word line, selected selection line, and unselected selection line.

The address decoder 520 is configured to decode a column address from the received address ADDR. The address decoder 520 delivers the decoded column address DCA to the read-write circuit 530.

In an exemplary embodiment, the address decoder 520 may include a row decoder decoding a row address, a column decoder decoding a column address, and an address buffer storing a received address ADDR.

The read-write circuit 530 is connected to the memory cell array 510 through bit lines BL, and is connected to the data I/O circuit 540 through data lines DL. The read-write circuit 530 operates in response to a control of the control logic 560. The read-write circuit 530 receives a decoded column address DCA from the address decoder 520. Using the decoded column address DCA, the read-write circuit 530 selects bit lines BL.

The read-write circuit 530 receives data over data lines DL from the data I/O circuit 540, and writes received data over bit lines BL to the memory cell array 510. The read-write circuit 530 reads data over the bit lines BL from the memory cell array 510 and delivers the read data over the data lines DL to the data I/O circuit 540.

In an exemplary embodiment, the read-write circuit 530 may include a page buffer, or page register, and a column selection circuit. In an exemplary embodiment, the read-write circuit 530 may further include a sense amplifier, a write driver, and a column selection circuit.

The data I/O circuit 540 is connected to the read-write circuit 530 through data lines DL. The data I/O circuit 540 operates in response to a control signal of the control logic 560. The data I/O circuit 540 is configured to exchange data DATA with an external device or network. The data I/O circuit 540 is configured to deliver data DATA from the external device or network to the read-write circuit 530 through data lines DL. The data I/O circuit 540 is configured to output data DATA delivered from the read-write circuit 530 through data lines DL to the external device or network. In an exemplary embodiment, the data I/O circuit 540 may include a data buffer.

The voltage generating circuit 550 is connected to the memory cell array 510, the address decoder 520, and the control logic or circuit 560. The voltage generating circuit 550 receives power from an external power source. In an exemplary embodiment, the voltage generating circuit 550 receives a power voltage Vcc and a negative or ground voltage Vss from the external power source. In response to a control signal of the control logic or circuit 560, the voltage generating circuit 550 is configured to generate voltages having various voltage levels from the power voltage Vcc and the negative or ground voltage Vss. In an exemplary embodiment, the voltage generating circuit 550 is configured to generate various voltages such as a high voltage VPP, a program voltage Vpgm, a pass voltage Vpass, a read voltage Vread, and an erase voltage Vers.

Voltages generated by the voltage generating circuit 550 are supplied to the address decoder 520 and the memory cell array 510 under control of the control logic or circuit 560. For example, a program voltage Vpgm and a pass voltage Vpass may be supplied to the address decoder 520 during a program operation. During a read operation, a read voltage Vread may be supplied to the address decoder 520. During an operation of erasing the memory cell array 510, an erase voltage Vers may be supplied to the memory cell array 510. Voltages generated by the voltage generating circuit 550 are not limited to the above-mentioned voltages.

The control logic or circuit 560 is connected to the address decoder 520, the read-write circuit 530, and the data I/O circuit 540. The control logic or circuit 560 may be further connected to, or include, a pass/fail check circuit. The control logic or circuit 560 is configured to control general operations of the nonvolatile memory device 500. The control logic or circuit 560 operates in response to a control signal CTRL delivered from the external device or network.

Figure 15A:
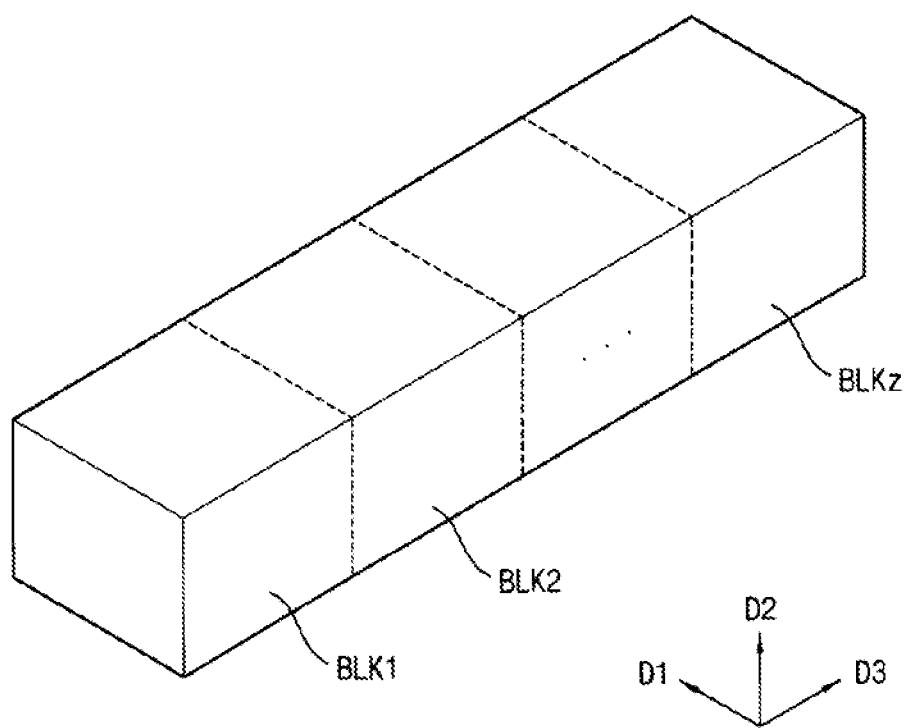
FIG. 15*a* is a perspective diagram illustrating the memory cell array in FIG. 14.
Figure 15B:
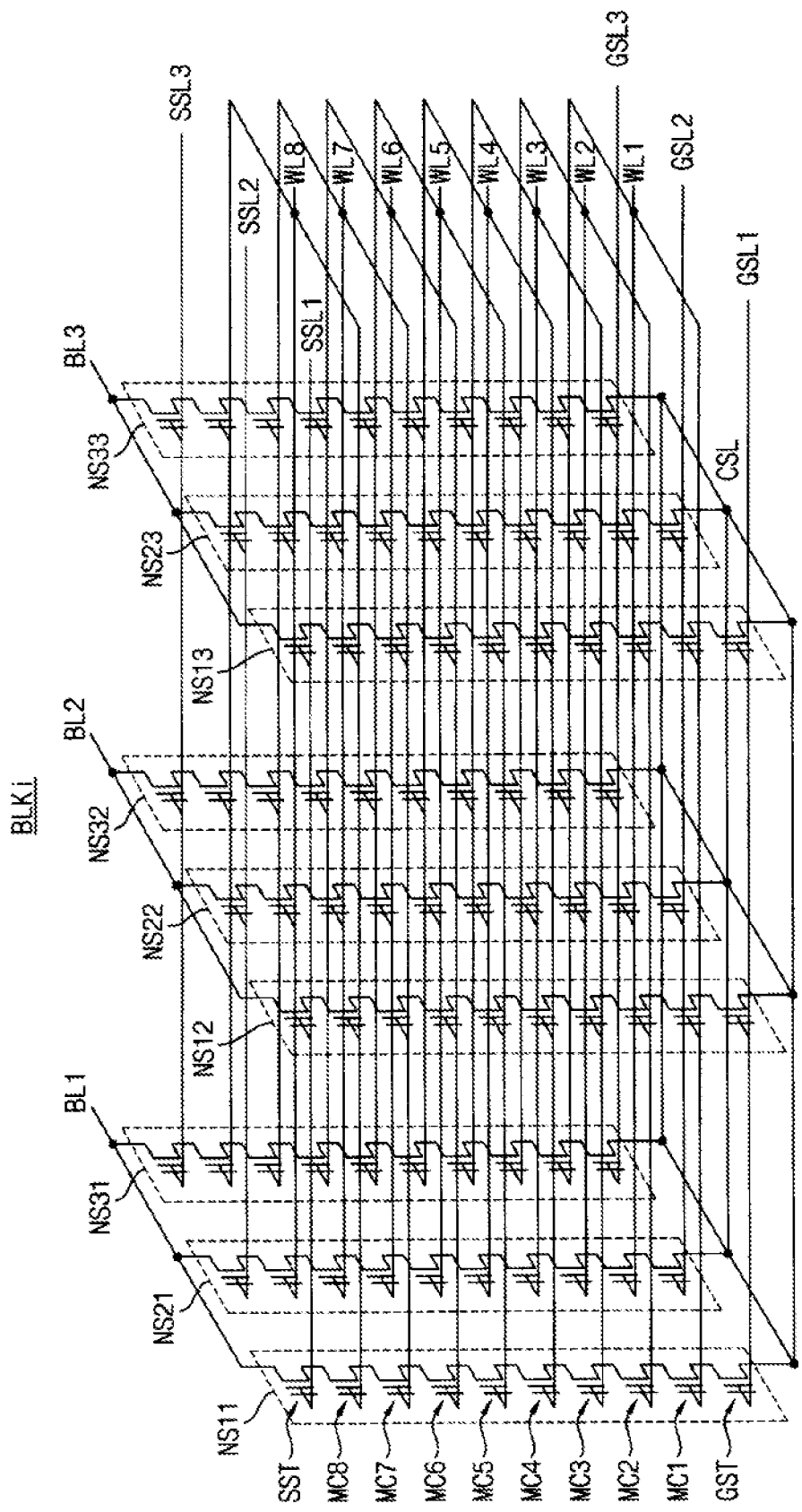
FIG. 15*b* is a circuit diagram illustrating an equivalent circuit of a memory block in FIG. 15*a*.

FIG. 15a illustrates the memory cell array in FIG. 14, and FIG. 15b illustrates an equivalent circuit of a memory block in FIG. 15a.

Referring to FIG. 15a, the memory cell array 510 may include a plurality of memory blocks BLK1 to BLKz. In an exemplary embodiment, the memory blocks BLK1 to BLKz may be selected by the address decoder 520. For example, the address decoder 520 may select a particular memory block BLKi corresponding to a block address among the memory blocks BLK1 to BLKz.

The memory block BLKi of FIG. 15b may be formed on a substrate in a three-dimensional structure, such as a vertical NAND (VNAND) structure. For example, a plurality of memory cell strings included in the memory block BLKi may be formed in a direction perpendicular to the substrate.

Referring to FIG. 15b, the memory block BLKi may include memory cell strings NS11 to NS33 coupled between bit-lines BL1, BL2 and BL3 and a common source line CSL. Each of the memory cell strings NS11 to NS33 may include a string selection transistor SST having its gate connected to a corresponding cell string select line, and a ground selection transistor GST having it gate connected to a corresponding ground select line, and a plurality of memory cells MC1 through MC8 connected therebetween. In FIG. 15b, each of the memory cell strings NS11 to NS33 is illustrated to include eight memory cells MC1 to MC8. However, embodiments are not limited thereto. In an alternate embodiment, each of the memory cell strings NS11 to NS33 may include any number of memory cells.

The string selection transistor SST may be connected to corresponding string selection lines SSL1 to SSL3, and each define a cell string of vertically arranged memory cells. The plurality of memory cells MC1 to MC8 may be connected to corresponding word-lines WL1 to WL8, respectively. The ground selection transistor GST may be connected to corresponding ground selection lines GSL1 to GSL3. The string selection transistor SST may be connected to corresponding bit-lines BL1, BL2 and BL3, and the ground selection transistor GST may be connected to the common source line CSL.

Word-lines (e.g., WL1) having the same height may be commonly connected, and the ground selection lines GSL1 to GSL3 and the string selection lines SSL1 to SSL3 may be separated. The ground select lines GSL1 through GSL3 may also be commonly connected to one another, but aren't limited thereto. In an alternate embodiment, the memory cell array 510 may be coupled to any number of word-lines and bit-lines.

Figure 16:
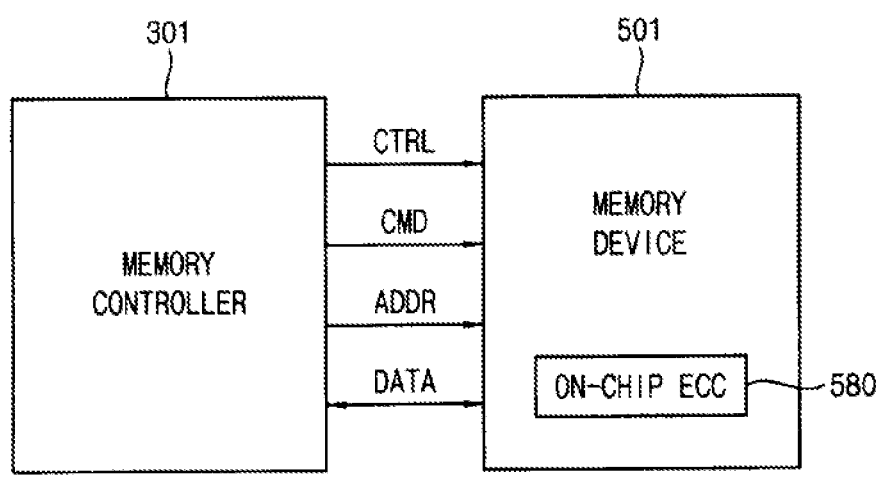
FIG. 16 is a schematic block diagram illustrating a memory system according to an exemplary embodiment of the present disclosure.

FIG. 16 illustrates a memory system according to an exemplary embodiment.

Referring to FIG. 16, a memory system may include a memory controller 301 and at least one memory device 501.

The memory device 501 may perform read, write and erase operations under control of the memory controller 301. The memory device 501 may receive control signals CTRL, commands CMD, addresses ADDR and write data DATA from the memory controller 301 and transmit read data DATA to the memory controller 301.

The memory device 501 may include an on-chip ECC circuit 580. When the data is written in the memory cell array, the on-chip ECC circuit 580 may encode the data to generate parity bits. For example, the parity bits may be stored in a parity data region in the memory cell array. When the data are read out from the memory cell array, the on-chip ECC circuit 580 may decode the read data and the parity bits to check and correct any bit errors. The on-chip ECC circuit 580 may include an encoder and a decoder for performing such encoding and decoding. According to an exemplary embodiment, the decoder in the on-chip ECC circuit 580 may provide logic operation data, similar to the ECC decoder of FIG. 13, by performing a logic operation on a plurality of read data that are read out from the plurality of storage regions, and perform a combined ECC decoding based on the logic operation data.

Figure 17:
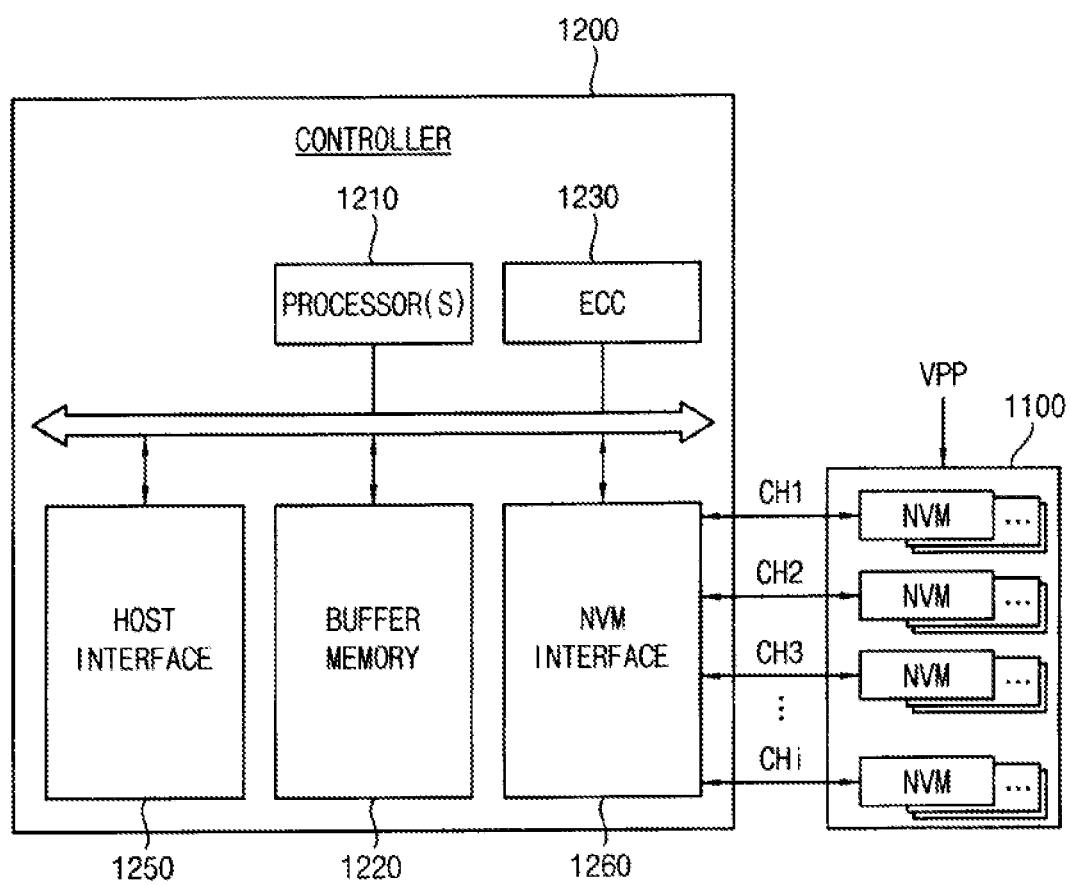
FIG. 17 is a schematic block diagram illustrating a solid-state disk or solid-state drive (SSD) according to an exemplary embodiment of the present disclosure.

FIG. 17 illustrates a solid-state disk or solid-state drive (SSD) according to an exemplary embodiment.

Referring to FIG. 17, an SSD includes a nonvolatile memory array 1100 having multiple channels of nonvolatile memory devices NVM connected to an SSD controller 1200.

The SSD controller 1200 is connected to the nonvolatile memory devices NVM of the array 1100 through multiple channels CH1 to CHi, respectively. The SSD controller 1200 includes one or more processors 1210, a buffer memory 1220, an ECC block 1230, a host interface 1250, and a nonvolatile memory interface 1260. The buffer memory 1220 stores data used to drive the SSD controller 1200. The buffer memory 1220 comprises multiple memory lines each storing data or a command. The ECC block 1230 calculates error correction code values for data to be programmed at a write operation, and corrects any errors in read data using an error correction code value at a read operation. In a data recovery operation, the ECC block 1230 corrects an error in data recovered from the nonvolatile memory devices NVM.

As described above, A storage controller, a storage system and/or a method of operating the storage controller may efficiently receive a plurality of data corresponding to each of the plurality of memories. In addition, a storage controller, a storage system and a method of operating the storage controller may efficiently receive a plurality of data through various paths, prioritizing either reliability and/or receiving speed.

The present inventive concept may be applied to any devices and systems including a memory device with error check and correction functionality. For example, the present inventive concept may be applied to systems such as a mobile phone, a smart phone, a personal digital assistant (PDA), a portable multimedia player (PMP), a digital camera, a camcorder, a personal computer (PC), a server computer, a workstation, a laptop computer, a digital television (TV), a set-top box, a portable game console, a navigation system, or the like.

The foregoing is illustrative of exemplary embodiments and is not to be construed as limiting thereof. Although exemplary embodiments have been described, those of ordinary skill in the pertinent art may readily appreciate that many modifications are possible without materially departing from the present inventive concept.

What is claimed is:

1. A storage controller comprising:
    a plurality of parallel input channels configured for simultaneously receiving a plurality of raw data from a plurality of redundant memories, respectively;
    an error estimation unit configured to generate error information by estimating an error level of the plurality of raw data;
    a decision unit configured to perform a logical operation on the plurality of raw data to generate operation data;
    an error correction unit configured to generate error correction data by correcting an error of the operation data; and
    a selection unit configured to select one of the operation data or the error correction data based on the error information.

2. The storage controller of claim 1, wherein the decision unit includes:

a hard decision unit configured to generate hard decision operation data by performing a majority decision logical operation on corresponding bits of the plurality of raw data.

3. The storage controller of claim 2, wherein each of the corresponding bits has a first value or a second value, and
wherein the hard decision unit sets a bit value of the hard decision operation data to the first value when bits having the first value among the corresponding bits are more numerous than bits having the second value among the corresponding bits.

4. The storage controller of claim 3, wherein the hard decision unit generates hard decision error data based on the plurality of raw data, and
wherein the hard decision unit sets a bit value of the hard decision error data to a first logical value when the corresponding bits have both of the first value and the second value and when a difference between a number of bits having the first value among the corresponding bits and a number of bits having the second value among the corresponding bits is equal to or less than a predetermined value.

5. The storage controller of claim 4, wherein the hard decision error data indicate locations where uncorrected errors are likely to exist in the hard decision operation data.

6. The storage controller of claim 1, wherein the decision unit includes:
a logical OR circuit configured to perform a logical OR operation on corresponding bits of the plurality of raw data;
a logical AND circuit configured to perform a logical AND operation on the corresponding bits;
a majority voting circuit configured to perform a majority decision logical operation on the corresponding bits; and
a multiplexer configured to select one of results of the logical OR operation, the logical AND operation or the majority decision logical operation, and generate a selected one of the results as hard decision operation data.

7. The storage controller of claim 1, wherein the decision unit includes:
a hard decision unit configured to generate hard decision operation data by performing a first logical operation on corresponding bits of the plurality of raw data; and
a soft decision unit configured to generate soft decision error data by performing a second logical operation on the corresponding bits of the plurality of raw data.

8. The storage controller of claim 7, wherein each of the corresponding bits has a first value or a second value, and
wherein the soft decision unit generates the soft decision error data based on the plurality of raw data, and the soft decision unit sets a bit value of the soft decision error data to a first logical value when the corresponding bits have both of the first value and the second value.

9. The storage controller of claim 8, wherein the soft decision error data indicate locations where uncorrected errors are likely to exist in the hard decision operation data.

10. The storage controller of claim 7, wherein the storage controller further includes:
a logical OR gate configured to perform a logical OR operation on the error information from the error estimation unit and on attention information from a host such that the selection unit selects one of the operation data or the error correction data based on an output of the logical OR gate.

11. The storage controller of claim 10, wherein the selection unit selects the hard decision operation data regardless of the error information when the attention information indicates that the error level of the plurality of raw data is lower than a reference value.

12. The storage controller of claim 1, wherein the error estimation unit receives information indicating the error level of the plurality of raw data from a host, and the information received from the host is information that is related with a storage memory and accumulated while the storage memory is operating after the storage controller and the storage memory are established in a storage system.

13. A storage system comprising:
a storage memory configured to store a plurality of data in a plurality of redundant memory channels, respectively; and
a storage controller comprising:
an error estimation unit configured to read the plurality of data from the plurality of redundant memory channels and generate error information by estimating an error level of the read plurality of data;
a decision unit configured to perform a logical operation on the read plurality of data to generate operation data;
an error correction unit configured to generate error correction data by correcting an error of the operation data; and
a selection unit configured to select one of the operation data or the error correction data based on the error information.

14. The storage system of claim 13, wherein the decision unit includes:
a hard decision unit configured to generate hard decision operation data by performing a majority decision logical operation on corresponding bits of the plurality of data.

15. The storage system of claim 14, wherein each of the corresponding bits has a first value or a second value, and
wherein the hard decision unit sets a bit value of the hard decision operation data to the first value when bits having the first value among the corresponding bits are more numerous than bits having the second value among the corresponding bits.

16. The storage system of claim 15, wherein the hard decision unit generates hard decision error data based on the plurality of data, and
wherein the hard decision unit sets a bit value of the hard decision error data to a first logical value when the corresponding bits have both of the first value and the second value and when a difference between a number of bits having the first value among the corresponding bits and a number of bits having the second value among the corresponding bits is equal to or less than a predetermined value.

17. The storage system of claim 13, wherein the decision unit includes:
a hard decision unit configured to generate hard decision operation data by performing a first logical operation on corresponding bits of the plurality of data; and
a soft decision unit configured to generate soft decision error data by performing a second logical operation on corresponding bits of the plurality of data.

18. The storage system of claim 17, wherein each of the corresponding bits has a first value or a second value, and
wherein the soft decision unit generates the soft decision error data based on the plurality of data, and the soft decision unit sets a bit value of the soft decision error data to a first logical value when the corresponding bits have both of the first value and the second value.

19. The storage system of claim 18, wherein the soft decision error data indicate locations where uncorrected errors are likely to exist in the hard decision operation data.

20. A storage controller comprising:
- a plurality of parallel input channels configured for simultaneously receiving a plurality of raw data from a plurality of redundant memories, respectively;
- an error estimation unit configured to generate error information by estimating an error level of the plurality of raw data;
- a decision unit configured to perform a logical operation on the plurality of raw data to generate operation data, the decision unit including a hard decision unit and a soft decision unit, the hard decision unit being configured to generate hard decision operation data by performing a majority decision logical operation on corresponding bits of the plurality of raw data, the soft decision unit being configured to generate soft decision error data by performing a second logical operation on the corresponding bits of the plurality of raw data;
- an error correction unit configured to generate error correction data by correcting an error of the operation data; and
- a selection unit configured to select one of the operation data or the error correction data based on the error information.

* * * * *